US 6,745,032 B1

(12) United States Patent
Alvesalo et al.

(10) Patent No.: US 6,745,032 B1
(45) Date of Patent: Jun. 1, 2004

(54) TRANSMISSION LINK OPTIMIZATION

(75) Inventors: Antero Alvesalo, Espoo (FI); Markku Verkama, Espoo (FI); Jukka Virtanen, Lempäälä (FI)

(73) Assignee: Nokia Corporation, Espoo (FI)

( * ) Notice: Subject to any disclaimer, the term of this patent is extended or adjusted under 35 U.S.C. 154(b) by 590 days.

(21) Appl. No.: 09/677,193

(22) Filed: Oct. 2, 2000

Related U.S. Application Data

(63) Continuation of application No. PCT/FI99/00280, filed on Apr. 1, 1999.

(30) Foreign Application Priority Data

Apr. 3, 1998 (FI) .................................................. 980773

(51) Int. Cl.[7] .................................................. H04Q 7/20
(52) U.S. Cl. ..................... 455/436; 455/432.1; 455/439; 455/445
(58) Field of Search ............................ 455/432.1, 432.2, 455/432.3, 433, 434, 435.1, 436, 437, 438, 442, 450, 161.1, 439, 445, 435.2; 370/351, 328, 331

(56) References Cited

U.S. PATENT DOCUMENTS

| | | | | |
|---|---|---|---|---|
| 5,305,466 A | | 4/1994 | Taketsugu | |
| 5,822,696 A | * | 10/1998 | Bergkvist | 455/436 |
| 6,223,042 B1 | * | 4/2001 | Raffel | 455/455 |
| 6,377,787 B1 | * | 4/2002 | Bamburak et al. | 455/161.1 |
| 6,411,807 B1 | * | 6/2002 | Amin et al. | 455/432.3 |
| 6,456,652 B1 | * | 9/2002 | Kim et al. | 375/224 |
| 6,510,319 B2 | * | 1/2003 | Baum et al. | 455/442 |

FOREIGN PATENT DOCUMENTS

| | | |
|---|---|---|
| EP | 0701382 | 3/1996 |
| EP | 0898438 | 2/1999 |
| FI | 100445 | 8/1996 |
| WO | WO 98/18282 | 4/1998 |

* cited by examiner

*Primary Examiner*—Sonny Trinh
(74) *Attorney, Agent, or Firm*—Squire, Sanders & Dempsey L.L.P.

(57) ABSTRACT

A method, a mobile communication system and a controller controlling the use of the radio resources of the mobile communication system, by means of which it is decided when the optimization of the Iu link between a mobile switching centre and the controller is triggered. In the method, history data is maintained (204, 205, 206, 214) on the roaming of the mobile station, at least on condition triggering the link optimization is set based on the history data, a check is made in response to updating the history data to see if the condition is fulfilled (207), and if the condition is fulfilled, the link optimization is triggered (208, 209, 210).

17 Claims, 5 Drawing Sheets

TRANSMISSION LINK OPTIMIZATION

This application is a continuation of PCT/FI99/00280, filed Apr. 1, 1999.

BACKGROUND OF THE INVENTION

The invention relates to triggering the optimization of a link between network elements controlling the radio channels of a mobile communication system and a mobile switching centre as a result of handover, and particularly to when the optimization is triggered.

Cellular communication systems are characterized in that mobile stations can freely move and connect from one cell to another within the area of the mobile communication system. Crossover is just a re-registration to a new cell, when the mobile station does not have an ongoing call. If a mobile station has an ongoing call during crossover, the call must also be connected from one base station to another with as little disturbance to the call as possible. Crossover performed during a call is called handover. Handover may also take place within a cell from one traffic channel to another.

Several different types of handovers can be distinguished depending on which elements of the mobile communication system participate in handover. In the following, handover types are described using the IMT-2000 system (International Mobile Telecommunication 2000) as an example system. It is one of the third-generation mobile communication systems. Another example of a corresponding system is Universal Mobile Communication System (UMTS). UMTS is being standardized in ETSI (European Telecommunication Standards Institute), whereas the IMT-2000 system is being standardized by ITU (International Telecommunication Union). These future systems are very similar in basic features. The network architecture of the IMT-2000 system is illustrated in FIG. 1. It describes the parts of the system that are most important for handover. Mobile switching centres MSC connect incoming and outgoing calls and control the radio network controllers RNC of their areas. In the following, the mobile switching centre and the radio network controller are connected by referring to the mobile switching centre as the radio network controller's own mobile switching centre. For instance, in FIG. 1, the radio network controllers RNC1 and RNC2 have the same own mobile switching centre MSC1 and the radio network controller RNC3's own mobile switching centre is MSC2. The radio network controllers RNC are responsible for the control functions related to radio access and control the base transceiver stations BTS in their area, through which the mobile stations are connected to the network over radio paths. The details of the network structure bear no essential significance for the invention.

There are three basic types of handover. When a mobile station remains in the area of the same radio network controller RNC, the handover is called handover between base transceiver stations. When the radio network controller area changes, but the mobile station remains within the area of the same mobile switching centre MSC, the handover is called internal handover within a mobile switching centre. When the mobile station moves from the area of the first mobile switching centre MSC-1 to the area of a second mobile switching centre MSC-2, the handover is called handover between mobile switching centres. Additionally, systems using code division multiple access (CDMA), such as the known third-generation mobile communication systems currently being developed, handover is either soft or hard. In a soft handover, the mobile station can during handover be simultaneously connected to the network through several base transceiver stations, until one of them proves to be better than the others on the basis of its signal. In a hard handover, the mobile station is connected to the network through only one base transceiver station.

When a call is made to or from a mobile station MS, a connection is established between the mobile station and a mobile switching centre MSC. The connection is established through a radio network controller RNC. This radio network controller is called the serving RNC and other radio network controllers are drift RNCs. The serving RNC is also called an anchor RNC. The serving RNC acts for instance as a combining point, i.e. it handles the diversity combining in soft handover. The connection to the switching centre is established by creating an Iu link for the call, i.e. a speech channel between the serving RNC and its own mobile switching centre. During handover, the serving RNC can be maintained by means of an interface Iur between the radio network controllers. A drift RNC can also be a serving RNC at the same time acting for instance as a combining point in soft handovers. According to present knowledge, when handover is completed between two radio network controllers RNC, the drift RNC becomes the serving RNC from which a new Iu link is created for the call, and the old link is released. An alternative solution is that the radio network controller which is the first serving radio network controller stays as the serving radio network controller and a new Iu link is not created.

The problem with the above solution conforming to present knowledge is the continuous change of Iu link, if the mobile station moves back and forth between two radio network controllers and causes an Iu link optimization after each handover, or alternatively moves quickly from one area to another. This is illustrated in the example in FIG. 1, in which a mobile station MS makes a call while being in area A1 and moves to area A2 during the call as indicated with the arrow. The serving RNC is first RNC1 and the Iu link is Iu1. The mobile station moves to the area of radio network controller RNC2 and the Iu link is optimized to Iu2. Next, the mobile station moves to the area of radio network controller RNC3 and the Iu link is optimized to Iu3. If the move happens quickly, the optimization of the Iu link to Iu2 uses up network resources unnecessarily. Correspondingly, if the mobile station moves back and forth, for instance between the areas of base transceiver stations BTS1 and BTS2, and causes an optimization of the Iu link with every handover, network resources would be unnecessarily used. Again, if the mobile station stays long under the control of radio network controller RNC2, network resources can be saved by optimizing Iu2 as the Iu link.

The problem with the alternative solution is that network resources are unnecessarily used if the Iu link is not optimized again. Network resources are especially misspent in the example in FIG. 1 when the mobile station moves from area A1 to area A2, if Iu1 remains as the Iu link even if it is under the control of a different mobile switching centre. The problem is emphasized, if the RNC-RNC connections are not built separately and they utilize the same transmission resources as the MSC-RNC connections.

BRIEF DESCRIPTION OF THE INVENTION

It is thus an object of the invention to develop a method and an apparatus implementing the method, which solve the above-mentioned problems and perform the Iu link optimization just at the right time in a manner which saves network resources. This object is achieved by a method, a system, a controller and a mobile station characterized by what is disclosed in the independent claims. The preferred embodiments of the invention are set forth in the dependent claims.

The invention is based on the idea that information, i.e. history data, is collected concerning handovers of a mobile station and after certain conditions based on the history data are fulfilled, the Iu link between the mobile switching centre and a radio network controller is optimized again.

The method and system of the invention provide the advantage that unnecessary optimization of the Iu link is avoided and the link is optimized only when the optimization saves network resources. The mobile station performs handovers between radio network controllers normally, but to the network side the handover between the radio network controllers, i.e. the Iu link optimization, is performed in a manner which optimizes the use of network resources.

In a preferred embodiment of the invention, the history data includes network information that is updated in connection with each handover. This provides the advantage that the conditions triggering optimization can be made versatile to better take different handovers into consideration.

In a further preferred embodiment of the invention, the history data comprises a handover counter which is updated in connection with handovers between controllers. By means of the counter, it is very simple to detect handovers between controllers and react to them.

BRIEF DESCRIPTION OF THE DRAWINGS

In the following, the invention will be described in greater detail in connection with preferred embodiments and with reference to the attached drawings in which.

DETAILED DESCRIPTION OF THE INVENTION

Figure 1:
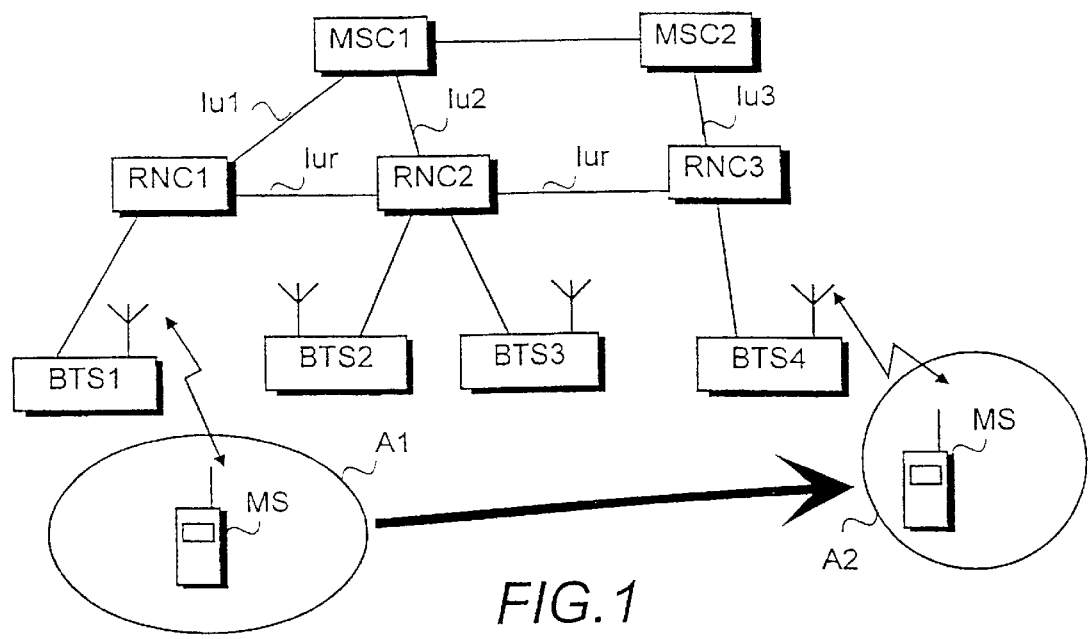
FIG. 1 illustrates a mobile communication system of the invention.

The present invention can be applied to any cellular communication system in which routing of connections is based on the use of a serving RNC or a corresponding network element. In the following, the invention will be described in greater detail in an exemplary manner in connection with the IMT-2000 system without limiting the invention to this solution, however. FIG. 1 shows a simplified IMT-2000 network structure described earlier in the text. A mobile communication system implementing the functionality of the present invention comprises not only means required for prior art optimization of the Iu link, but also means for maintaining and updating the history data and means for comparing the history data and the predefined condition(s). The means are preferably located in the radio network controller RNC. The means or a part of them can also be located elsewhere, for instance in the mobile switching centre or in the mobile station.

The present invention can be applied to various handovers. The invention is in no way related to the factors triggering handover of air interface or to which network element is the one deciding on the handover of a mobile station.

Figure 2:
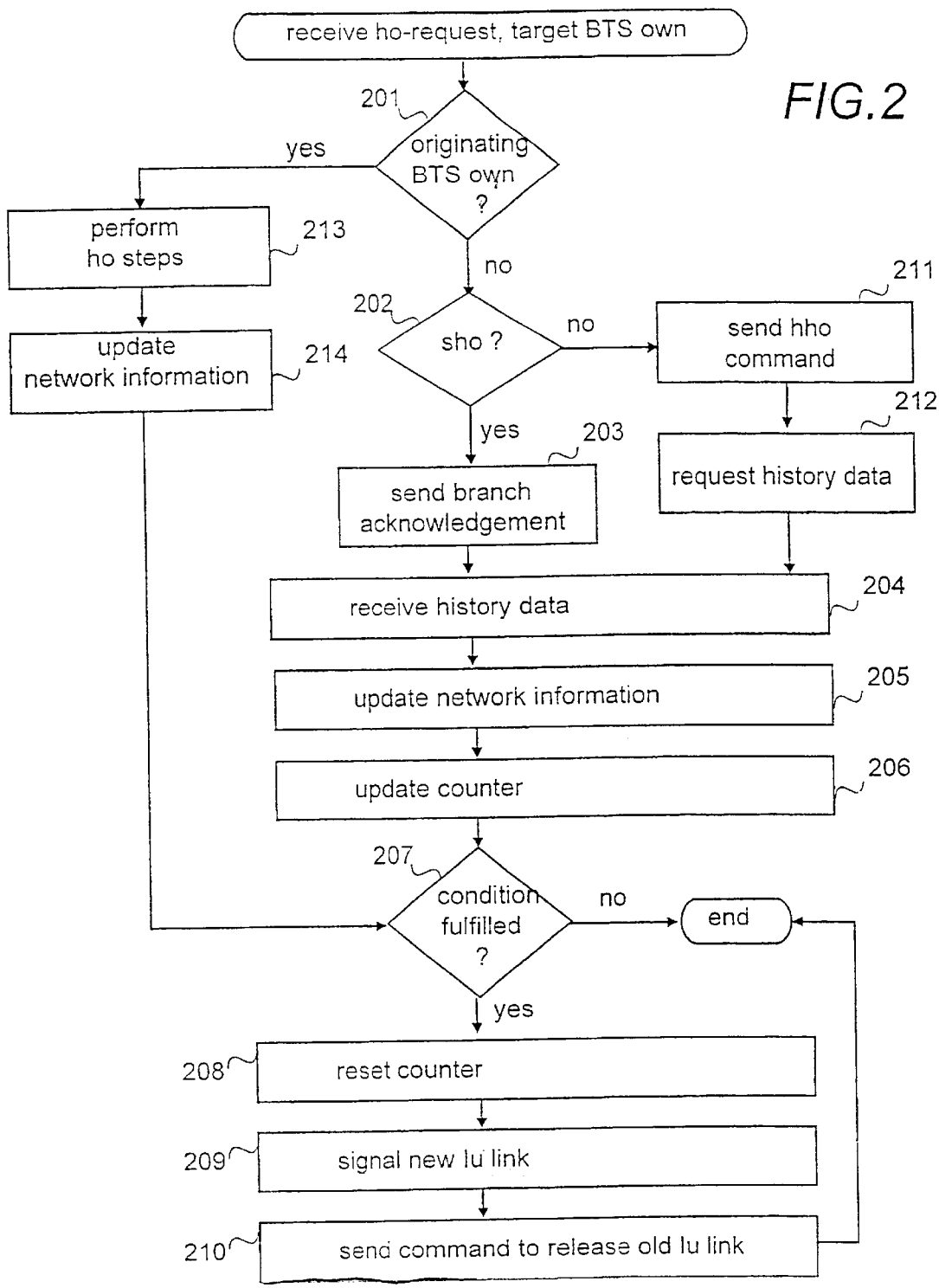
FIGS. 2 and 3 show a flow chart of radio network controller functions in the first preferred embodiment of the invention.

FIG. 2 shows a flow chart of the radio network controller functions in the first preferred embodiment of the invention in which the target cell of the handover is in the service area of a radio network controller. In the first preferred embodiment of the invention, the history data is maintained in the radio network controller RNC and the history data comprises both network information and a handover counter. Additionally, the history data is updated in the radio network controller in which service area the target cell is. The history data could also be updated in the radio network controller in which service area the originating cell is.

The initial situation in FIG. 2 is that a radio network controller receives a handover request (ho request) whose target base transceiver station BTS is under the control of the radio network controller. In step 201 it is checked if the originating base transceiver station is under the control of the radio network controller. If the originating base transceiver station is not under the control of the radio network controller, in step 202 it is checked if this is a soft handover (sho). If the handover request is for a soft handover, in step 203 a branch acknowledgement is transmitted. Naturally, this happens on the condition that the radio network controller can accept the soft handover and does not have to refuse it for instance due to misspending of resources. In such a case, the mobile station is commanded to generate a hard handover. Some time after the branch acknowledgement, in step 204 history data is received from the RNC in which area the originating cell is. Next, in step 205 the network information in the history data is updated. In the first preferred embodiment, the network information is updated by adding as the latest network information data on the base transceiver currently serving the mobile station, information on the radio network controller itself and on its own mobile switching centre. The network information can also include information on when handover has been made. Next, in step 206 the handover counter is updated, as this concerns handover between radio network controllers. In this embodiment it does not matter, whether it is a case of internal handover within a mobile switching centre or handover between mobile switching centres. In another embodiment, these can also be taken into account for instance by using a separate counter for handovers between mobile switching centres or by increasing the handover counter reading with figures of different size for different handover types. After the updates, in step 207 it is checked if the condition is fulfilled or, if there are several conditions, whether one of them is fulfilled. An operator can freely define the conditions and there is no maximum limit to them. However, there must always be at least one condition. The condition can, at its simplest, be just a certain value of the handover counter, for instance 2, or a minimum time elapsed from the previous handover. A condition may include complex expressions, for instance as follows: if the mobile switching centre has changed or if the RNC has stayed the same during the last two handovers, but the third last handover was performed in the area of another RNC, the Iu link is optimized. If the condition was not fulfilled in step 207, the next handover will be waited for. If the condition or one of the conditions was fulfilled, the handover counter is reset to zero in step 208, the Iu link is optimized by signalling a speech channel open to the mobile switching centre in step 209, after which in step 210 a command is sent to release the old Iu link. In one embodiment, also the network information or a part of it is reset to zero after the condition is fulfilled.

If the received handover request is for a hard handover (step 202), a command is sent in step 211 to perform a hard handover (hho). After this, in step 212 history data is requested from the RNC in whose area the originating cell is, and operation moves to step 204 in which the requested history data is received. From step 204, operation continues as described above.

If the handover is an internal one within a radio network controller, operation moves from step 201 to step 213 in which normal handover steps are performed. After handover has been performed, the network information is updated in step 214. After the update, operation moves to step 207 in which it is checked if the condition or one of the conditions is fulfilled. From step 207, operation continues as described above.

Figure 3:
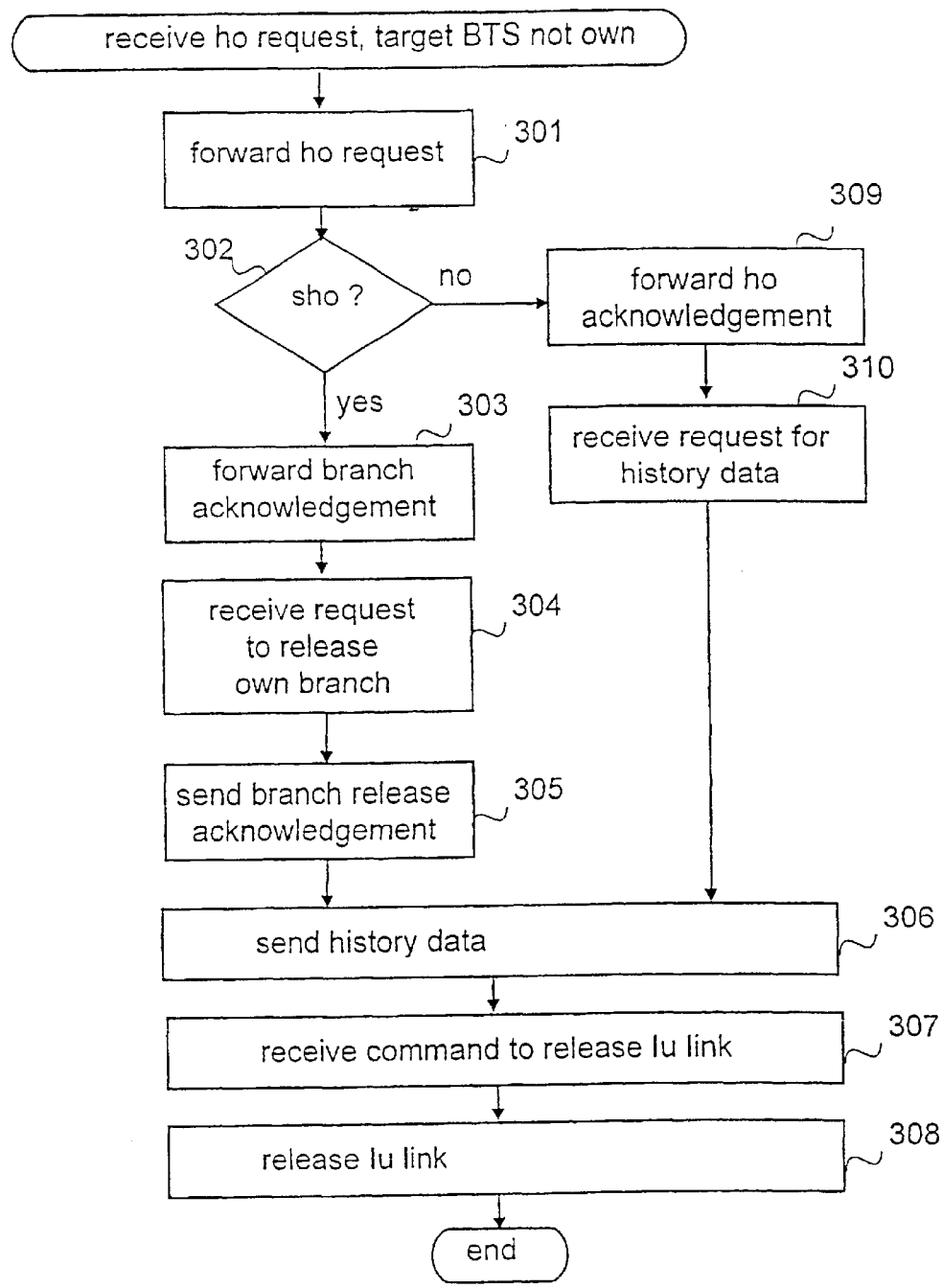

The initial situation in FIG. 3 is that a radio network controller receives a handover request (ho request) whose target base transceiver station is not under the control of the radio network controller. This means that the originating base transceiver station is under the control of the radio network controller. In step 301 the handover request is forwarded to the radio network controller whose base transceiver station is the target base transceiver station. (It is assumed here that the radio network controller can accept a soft handover and does not have to refuse it for instance due to misspending of resources. In such a case, the mobile station is commanded to generate a hard handover.) In step 302 it is checked if the handover request is for soft handover (sho). If the handover request is for soft handover, in step 203 branch acknowledgement is transmitted and after some time, in step 304 a request to release the radio network controller's own branch is received. In step 305 an acknowledgement for branch release is sent and after this, the entire history data is sent in step 306. After some time, the Iu link release command is received in step 307 and the Iu link is released in step 308.

If the handover request was for hard handover (step 302), in step 309 a handover acknowledgement is transmitted. After this in step 310, a request for the history data is received and from there, operation moves to step 306 in which the history data is sent. From step 306, operation continues as described above.

The steps described above in FIGS. 2 and 3 are not in an absolutely chronological order and some of the steps can be executed simultaneously or deviating from the given order. Other normal functions related to handover and Iu link optimization can also be executed between the steps. Some of the steps can also be left out. It is essential to update the history data at some point and to check after the update if the condition is fulfilled. In one embodiment, it is not necessary to separately request the history data in connection with hard handovers, as the radio network controller sends all of the history data after forwarding the handover acknowledgement. In the embodiments in which the history data does not include network information, steps relating to updating network information are not performed. Correspondingly in the embodiments in which the history data does not comprise a handover counter, steps relating to updating it are not performed.

If the history data is updated in the serving RNC (i.e. in the radio network controller in which area the originating cell is), steps relating to updating and the check concerning the condition are performed there, and the history data is sent only after the condition is fulfilled. Correspondingly, in such an embodiment, the radio network controller of the target cell sends updates to the history data to the radio network controller of the originating cell up until the Iu link is optimized.

If the history data is maintained in the mobile station, steps related to updating are performed there and the radio network controller requests the history data during each handover to check if the condition or one of the conditions is fulfilled. The radio network controller also sends updates to the history data to the mobile station during each handover. The radio network controller can request only some of the history data from the mobile station even though it sends all updates to the history data. This provides the advantage that different conditions are possible for different radio network controllers and yet the amount of data transmitted through the air path is minimized.

If the history data is maintained in the mobile switching centre, steps relating to updating are performed there and the radio network controller sends updates to the history data to the mobile switching centre during each handover. If the check of the condition(s) and triggering of the Iu link optimization are also performed in the mobile switching centre, the radio network controller does not have to request the history data or a part of it during each handover to check if the condition or conditions are fulfilled.

Figure 4:
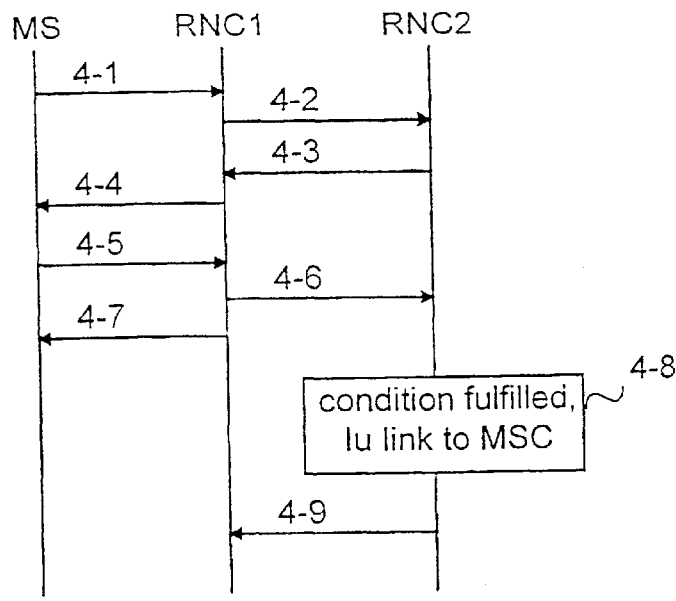
FIG. 4 shows a signalling diagram in the first preferred embodiment of the invention during soft handover.

FIG. 4 shows the signalling of the first preferred embodiment of the invention during soft handover. It is assumed for simplicity's sake that the mobile station is during soft handover only connected to two base transceiver stations of which one is under the control of the radio network controller RNC1 RNC2. The serving RNC of the mobile station is RNC1 from which an Iu link is established to its own mobile switching centre. The mobile station requests in message 4-1 for another branch for soft handover from the serving radio network controller RNC1. The serving radio network controller RNC1 detects that the target cell of the soft handover is in the area of the radio network controller RNC2 and sends a soft handover request to it in message 4-2. RNC2 accepts the soft handover and sends a branch addition permission in message 4-3 to RNC1 which then forwards the permission to the mobile station MS in message 4-4. When the signal of the base transceiver station in the service area of RNC2 proves to be better than a signal of another base transceiver station, the branch between the base transceiver station in the service area of RNC1 and the mobile station is released. The branch is released by sending from the mobile station MS a request to release the soft handover branch in message 4-5. When RNC1 identifies the request to release the branch and detects that the mobile station is about to leave its service area, it sends all history data to RNC2 in message 4-6, because the branch to be released was in a handover which was performed in the area of RNC2. At the same time, RNC1 sends a command in message 4-7 to the mobile station MS to release the branch.

When the radio network controller RNC2 receives the history data, it updates it to correspond to the new situation as described in FIG. 2. After the update, the radio network controller checks in step 4-8 if one of the predefined handover conditions is fulfilled. In the example shown in FIG. 4, the condition was fulfilled, in which case in step 4-8 the Iu link is optimized by signalling a speech channel open to the radio network controller RNC2's own mobile switching centre. Normal Iu connection creation procedures can be used when signalling this Iu link. When the Iu link is optimized, a command is sent in message 4-9 to the radio network controller RNC1 to release the Iu link reserved for the mobile station between RNC1 and its own mobile switching centre.

In connection with a hard handover, the signalling described in FIG. 4 changes so that messages 4-1, 4-2, 4-3 and 4-4 become messages for hard handover and messages 4-5 and 4-7 are not received. Instead, message 4-6 is sent only after RNC2 sends RNC1 a message requesting the history data. Step 4-8 and message 4-9 remain unchanged.

Figure 5:
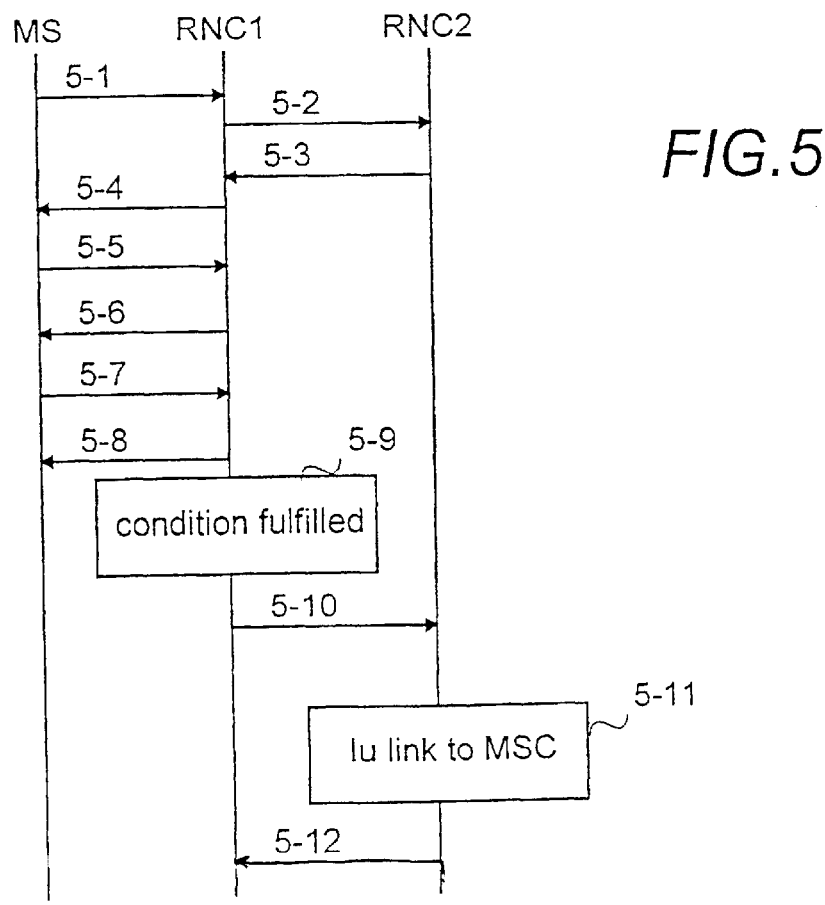
FIG. 5 shows a signalling diagram in the second preferred embodiment of the invention during soft handover.

FIG. 5 shows the signalling of the second preferred embodiment of the invention during soft handover. In the second preferred embodiment, the history data is maintained in the mobile station and the RNC which has an Iu link to the mobile switching centre checks the condition or conditions. It is again assumed for simplicity's sake that the mobile station is during soft handover connected to only two base transceiver stations of which one is under the control of the radio network controller RNC1 and the other correspondingly under the control of the radio network controller RNC2. The serving RNC of the mobile station is RNC-1 which has an Iu link to its own mobile switching centre.

The mobile station asks in message 5-1 for a second branch for soft handover from the serving radio network controller RNC1. The serving radio network controller RNC1 detects that the soft handover target cell is in the area of the radio network controller RNC2 and sends a soft handover request to it in message 5-2. RNC2 accepts the soft handover and sends a branch addition permission in message 5-3 to RNC1 which forwards the permission to the mobile station MS in message 5-4. At least one of the network controllers adds updates to the history data, i.e. update data, to the permission. In another preferred embodiment, the network controller RNC2 adds to the permission update data on itself, its mobile switching centre and the base transceiver station in whose area the soft handover branch is required. In addition to this, the network controller RNC1 adds to the permission data increasing the handover counter reading, because this is a handover between radio network controllers. When the signal of the base transceiver station in the service area of RNC2 proves to be better than a signal of another base transceiver station, the branch between the base transceiver station in the service area of RNC1 and the mobile station is released. The branch is released by sending from the mobile station MS a request in message 5-5 to release the soft handover branch. When RNC1 identifies the request to release the branch, it requests history data from the mobile station MS in message 5-6. RNC1 can ask for all history data or just a certain part of the data, for instance only the history data of the mobile switching centres or the value in the handover counter, depending on what data it needs to check the condition or conditions triggering the Iu optimization. The mobile station sends the requested history data to RNC1 in message 5-7. Having received the history data, RNC1 sends a command in message 5-8 to the mobile station MS to release the branch. Next in step 5-9 the radio network controller RNC1 checks if one of the predefined handover conditions is fulfilled. In the example in FIG. 5, the condition is fulfilled, which means that a command to optimize the Iu link is sent in message 5-10 to the radio network controller RNC2 to whose area the mobile station has moved. RNC2 optimizes the Iu link in step 5-11 by signalling a speech channel open to its own mobile switching centre. After this, RNC2 informs the radio network controller RNC1 in message 5-12 that the Iu link optimization is completed. Having received the message, RNC1 releases the Iu link reserved for the mobile station to its own mobile switching centre.

Figure 6:
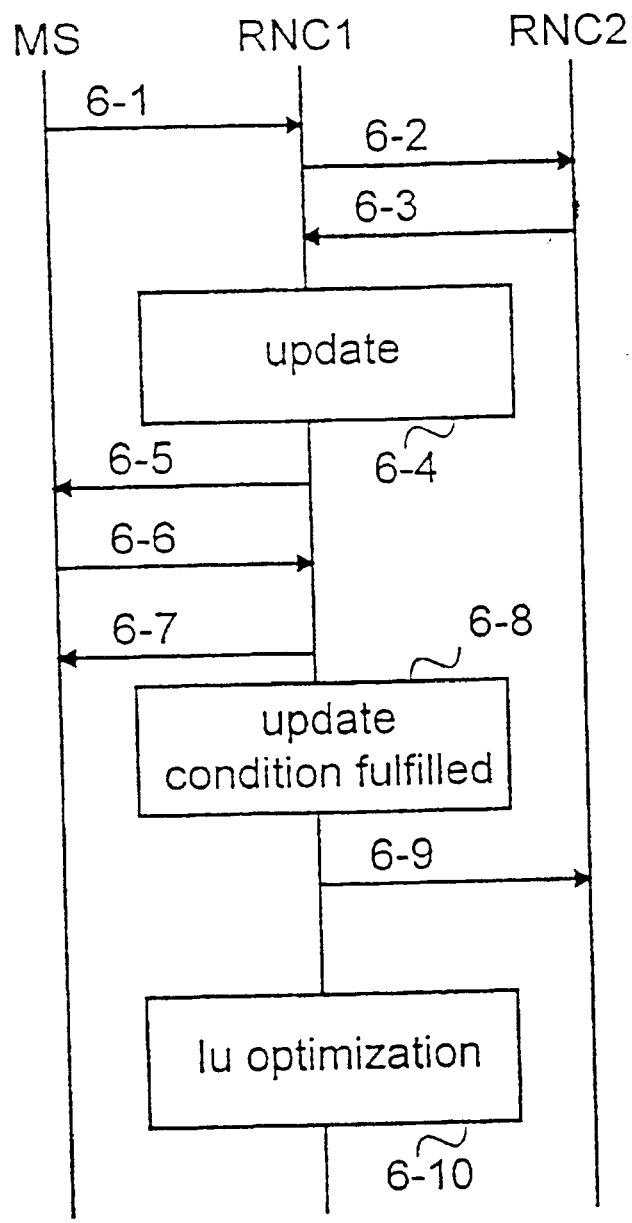
FIG. 6 shows a signalling diagram in the third preferred embodiment of the invention during soft handover.

FIG. 6 shows the signalling of the third preferred embodiment of the invention during soft handover. This embodiment is particularly well suited for situations where the Iu link should be in the radio network controller which has the most soft handover branches. It is assumed for simplicity's sake that the mobile station is during soft handover connected to only two base transceiver stations of which one is under the control of the radio network controller RNC1 and the other correspondingly under the control of the radio network controller RNC2. The serving RNC of the mobile station is RNC1 which has an Iu link to its own mobile switching centre. The mobile station asks in message 6-1 for another branch for soft handover from the serving radio network controller RNC1. The serving radio network controller RNC1 detects that the soft handover target cell is in the area of the radio network controller RNC2 and sends a soft handover request to it in message 6-2. RNC2 accepts the soft handover and sends a branch addition permission in message 6-3 to RNC1 which in step 6-4 updates the history data with the information on the branch addition and, at the same time, checks if the condition is fulfilled. In this example, the condition is not yet fulfilled. After this, RNC1 forwards the permission in message 6-5 to the mobile station MS. When the signal of the base transceiver station in the service area of RNC2 proves to be better than a signal of another base transceiver station, the branch between the base transceiver station in the service area of RNC1 and the mobile station is released. The branch is released by sending from the mobile station MS a request in message 6-6 to release the soft handover branch. RNC1 identifies the request to release the branch and sends a command to the mobile station MS in message 6-7 to release the branch. At the same time, in step 6-8 RNC1 updates the history data to correspond to the new situation as described in FIG. 2. After the update, the radio network controller checks in step 6-8 if one of the predefined handover conditions is fulfilled. In the example shown in FIG. 6, the condition is now fulfilled and RNC1 sends all history data to RNC2 in message 6-9. After this, RNC1 takes care of the Iu link optimization with normal procedures in step 6-10. After the optimization of the Iu link, the Iu link is established from RNC2 to its own mobile switching centre and the Iu link between RNC1 and its own centre has been released.

If the condition is not fulfilled in step 6-8, RNC1 receives history data updates from RNC2 in an update message (not shown in the figure) and executes step 6-8, i.e. updates the history data and checks the condition. When the condition is fulfilled, RNC1 sends message 6-9 and executes step 6-10.

If the condition had been fulfilled in step 6-4, message 6-9 would have been sent after sending message 6-5 or simultaneously with it. After this, step 6-10 would have been executed. After receiving message 6-6, RNC1 would have sent message 6-7 to the mobile station and a message for updating the history data to RNC2 in which the history data would have been updated.

In connection with a hard handover, the signalling described in FIG. 6 changes so that messages 6-1, 6-2, 6-3 and 6-5 become messages for hard handover, message 6-6 is not received and step 6-8 is not executed. If the condition is fulfilled in step 6-4, message 6-9 is sent and step 6-10 is executed. If the condition is not fulfilled in step 6-4, RNC1 receives history data updates in an update message from RNC2 and then executes step 6-4, i.e. updates the history data and checks the condition. When the condition is fulfilled, RNC1 sends message 6-9 and executes step 6-10. For clarity's sake, FIGS. 4, 5 and 6 above show only a part of the signalling related to handover and the network elements participating in the signalling. The invention is also not in any way restricted to the signalling messages described above, and the names of the network elements and participants in the signalling may vary by system. Signalling can also take place in a different order than described in FIGS. 4 and 5, some of the signalling messages in the figures can be divided into several parts or combined into one message. It is also possible to transmit more data in the signalling messages than described above.

The signalling described above is not restricted to whether the handover between the radio network controllers is internal within a mobile switching centre or between mobile switching centres, because each radio network controller optimizes the Iu link with its own mobile switching centre.

For clarity's sake, in the cases described in FIGS. 2, 3, 4, 5 and 6 it has been assumed that the mobile stations have two active connections at the most through two radio network controllers. In situations in which the mobile station has several active connections through several radio network controllers, information on the optimization of the Iu link must be transmitted at least in the embodiments in which history data is collected in the radio network controller from which the Iu link is optimized. In addition, new Iur links must possibly be created. This is done using normal Iur connection creation procedures.

If several Iu links are simultaneously maintained, it is possible to determine on the basis of the history data when any of the Iu links can be released and thus free network resources.

Figure 7:
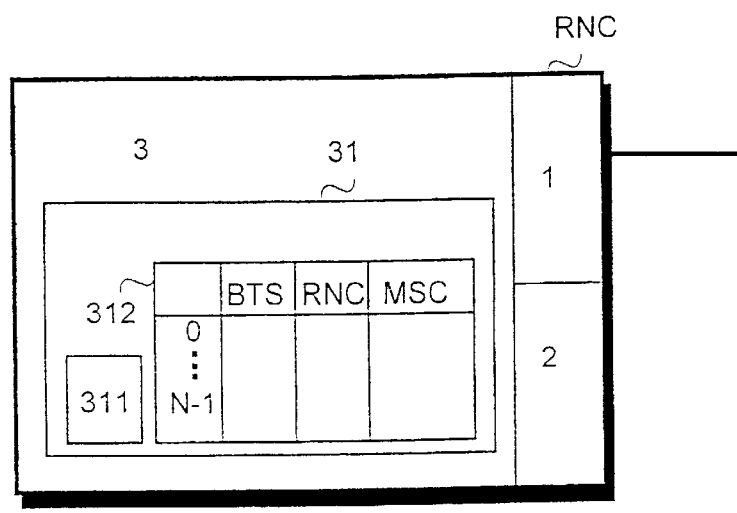
FIG. 7 shows a block diagram of a radio network controller of the first preferred embodiment of the invention.

FIG. 7 shows a block diagram of a radio network controller of the first preferred embodiment of the invention. The radio network controller refers to a network element which controls the use of the radio interface of its area. In different systems different names are used for these network elements, for instance in the GSM system, these are called base station controllers (BSC). The radio network controller of the present invention does not require major changes to a prior art radio network controller.

The radio network controller of the invention comprises at least a connection part 1 through which it receives messages from mobile switching centres, other radio network controllers, base transceiver stations and through base transceiver stations from mobile stations. Connection part 1 also connects calls between a mobile switching centre and a mobile station. By means of the connection part 1, the operator can set conditions to implement the Iu link optimization and update them. The condition can be different for each radio network controller and they need not be interdependent, if the operator so wishes. This provides the advantage that the structure of the network infrastructure can extremely well be taken into account when defining the conditions thus enabling an efficient optimization of network resources.

The radio network controller of the invention also comprises a control part 2 which handles the prior art functions of the radio network controller. In addition, the control part 2 is adapted to check the condition or conditions triggering the optimization of the Iu link, and when the condition is fulfilled, to optimize the Iu link in one of the ways described above. The control part 2 can also be adapted to update the history data maintained in the memory of the radio network controller. The control part 2 can also be adapted to transmit updates to the history data to another radio network controller. Alternatively, the control part 2 is adapted to request history data from a mobile station and to add to the messages sent to mobile stations updates to the history data as described above.

The radio network controller of the first preferred embodiment also comprises enough memory 3 to maintain the history data. The subscriber-specific history data 31 comprises in the first preferred embodiment a handover counter 311 and network information 312. The network information includes data on the base transceiver stations BTS, the radio network controller RNC and the mobile switching centre MSC of the N last handovers. When all memory locations reserved for network information are full, the oldest network information is deleted and the newest inserted. History data can also comprise only the handover counter or merely network information. Network information can include only a part of the above-mentioned data and, in addition to it, other data, such as the handover execution time or information on the existing branches of the call and their number per radio network controller. The number of branches in a soft handover can form the condition triggering the Iu link optimization. History data can also include information on what kind of channels a mobile station has or has had at a certain time.

The mobile station of the present invention does not require major changes to a prior art mobile station. The mobile station of the invention is adapted to maintain history data on its roaming, receive updates to the history data from the mobile communication network during handover and update the history data it maintains with the received data. The mobile station is also adapted to receive a request for the history data and advantageously send only the part of the history data that is requested. These functionalities can be implemented with program routines.

Even though it is said above that the history data is updated during handovers, the invention is not restricted to this alternative. The history data can be collected and updated also in connection with location updating. The invention is also not restricted to the alternative where the history data is maintained in one place. The maintenance of history data can also be distributed between the mobile station and the serving radio network controller for instance so that the mobile station maintains the network information and the radio network controller the handover counter. A corresponding distribution can also be made between the mobile switching centre and the radio network controller.

It will be understood that the above description and the related figures have merely been presented to illustrate the present invention. The specifications of mobile communication systems in general and of the IMT-2000 system in particular evolve rapidly. Including various functionalities in the network elements may change. Therefore, all terms and expressions should be interpreted as widely as possible and they are intended to describe and not to limit the invention. It will be obvious to those skilled in the art that as the technology evolves, the basic idea of the invention can be implemented in many different ways. The third-generation mobile communication systems are planned to be the primary areas of application of the invention. However, the invention can as applicable be used with the existing systems, such as the GSM system. The invention and its embodiments are thus not restricted to the examples described above, but can vary within the scope of the claims.

We claim:

1. A method for triggering the optimization of a call-related link between a controller controlling the radio interface of a mobile communication system and its mobile switching centre in a mobile communication system in which a mobile station can roam from one cell to another within the area of the system, in which method a call-related link is created between the first controller serving the location cell of a mobile station and its mobile switching centre to establish a call-related connection between the mobile station and the mobile switching centre, one or more handovers from the originating cell to a target cell are performed during the roaming of the mobile station, which cells can be located in the service areas of different controllers, in which case the handover takes place between controllers, history data concerning handovers of the mobile station is maintained, at least one condition, based on the history data, triggering the optimization of the call-related link is set, in response to updating the history data, a check is made to find out, if the condition is fulfilled, and if the condition is fulfilled, the link optimization is triggered.

2. A method as claimed in claim 1, wherein the history data includes network information comprising at least data on the controller serving the location cell of the mobile station, and in the method, a predefined amount of network information is maintained, and the network information is updated during each handover.

3. A method as claimed in claim 1, wherein the history data includes data on the channels used by the mobile station.

4. A method as claimed in claim 1, wherein the history data includes a handover counter, and in the method, the handover counter is updated during said handover between controllers.

5. A method as claimed in claim 4, wherein the handover counter is reset to zero in response to the triggering of the link optimization.

6. A method as claimed in claim 1, wherein at least a part of the history data is maintained in the mobile station, and updates to the history data are received during handover.

7. A method as claimed in claim 6, wherein a message requesting history data is received in the mobile station, and the part of the maintained history data which was requested is sent.

8. A method as claimed in claim 1, wherein at least a part of the history data is maintained in said first controller, and the maintained history data is transmitted during said handover between controllers from the first controller to the second controller serving the location cell.

9. A method as claimed in claim 1, wherein at least a part of the history data is maintained in said first controller, updates to the history are transmitted from the second controller serving the location cell to the first controller, and the maintained history data is transmitted from the first controller to the second controller in response to link optimization.

10. A mobile communication system comprising at least one mobile switching centre, at least two controllers to control the use of the air interface of the mobile communication system in their own areas, at least one mobile station which can roam in the mobile communication system from the service area of the first controller to the service area of the second controller during a call, and which system is adapted to perform at least one handover in the air interface as a result of roaming, and to connect a call between the mobile station and the mobile switching centre by means of a call-specific link between a controller serving the location cell of the mobile station and its mobile switching centre, wherein the mobile communication system further comprises memory means for storing history data concerning handovers of the mobile station, comparison means for comparing the history data with at least one predefined condition, and control means responsive to the comparison means for triggering the optimization of the call-related link.

11. A mobile communication system as claimed in claim 10, wherein the history data comprises network information on at least the controllers, and the memory means are adapted to update the network information during each handover of the mobile station.

12. A mobile communication system as claimed in claim 10, wherein the history data includes information on the channels used by the mobile station.

13. A mobile communication system as claimed in claim 10, wherein the history data comprises a handover counter, and the memory means are adapted to update the handover counter in response to handover between two controllers.

14. A controller controlling the use of the radio channels in a mobile communication system, which controller is connected to a mobile switching centre of the mobile communication system and to another corresponding controller, which controller is adapted to optimize a call-related link between the controller and the mobile switching centre, to compare history data concerning handovers of the mobile station with at least one predefined condition, and to generate the optimization of the link when the condition is fulfilled.

15. A controller as claimed in claim 14, being further adapted to maintain the history data.

16. A controller as claimed in claim 14, being further adapted to ask for the history data during a handover.

17. A controller as claimed in claim 16, being further adapted to ask for the history data from the mobile station, and to send network information containing data on at least the controller to the mobile station during handover.

* * * * *